United States Patent
Kramer

(10) Patent No.: US 9,355,358 B1
(45) Date of Patent: May 31, 2016

(54) SYSTEMS AND METHODS FOR DETERMINING COMPATIBILITY

(71) Applicant: Anthony Kramer, Woodbury, MN (US)

(72) Inventor: Anthony Kramer, Woodbury, MN (US)

(73) Assignee: Sparkstarter, LLC, Woodbury, MN (US)

( * ) Notice: Subject to any disclaimer, the term of this patent is extended or adjusted under 35 U.S.C. 154(b) by 280 days.

(21) Appl. No.: 13/887,306

(22) Filed: May 4, 2013

Related U.S. Application Data

(60) Provisional application No. 61/642,793, filed on May 4, 2012.

(51) Int. Cl.
*G06F 17/00* (2006.01)
*G06N 5/02* (2006.01)
*G06N 5/04* (2006.01)

(52) U.S. Cl.
CPC ... *G06N 5/04* (2013.01); *G06N 5/02* (2013.01)

(58) Field of Classification Search
None
See application file for complete search history.

(56) References Cited

U.S. PATENT DOCUMENTS

| 7,085,806 | B1* | 8/2006 | Shapira | 709/203 |
| 2004/0210661 | A1* | 10/2004 | Thompson | 709/228 |
| 2007/0015458 | A1* | 1/2007 | Corbett | 455/3.06 |
| 2010/0082683 | A1* | 4/2010 | Law et al. | 707/784 |
| 2010/0250676 | A1* | 9/2010 | Ufford et al. | 709/204 |
| 2010/0293476 | A1* | 11/2010 | Rosenblum et al. | 715/753 |

* cited by examiner

*Primary Examiner* — Kakali Chaki
*Assistant Examiner* — Luis Sitiriche
(74) *Attorney, Agent, or Firm* — Underwood & Associates

(57) ABSTRACT

Systems and methods for determining relationship compatibility are disclosed. In one embodiment, a computer-implemented method utilizes personality information provided by acquaintances of a subject user to match personality traits of other users. The systems and methods described herein can be used, e.g., as part of an online dating website, users are matched, in part, based on referral information provided by acquaintances.

25 Claims, 10 Drawing Sheets

SparkStarter.com

My Single Friend's Details

*First Name:

*Last Name:

*Email:

*Re-enter Email:

Describe Your Friend:

Next

FIG. 2B

SparkStarter.com

My Single Friend - Additional Details 238

*All Field Not Required

Region: [Minneapolis, Mn]
Gender: [ ]  Age: [ ]
Children: [ ]  In the Future: [ ]
Employment: [ ]  Education: [ ]
Height: [ ]  Build: [ ]
Smoking: [ ]  Drinking: [ ]
Religion: [ ]  Practice: [ ]

[Next] — 240

SYSTEMS AND METHODS FOR DETERMINING COMPATIBILITY

CROSS REFERENCE TO RELATED APPLICATIONS

This application claims priority to and the benefit of U.S. Provisional Patent Application No. 61/642,793, filed on May 4, 2012, the entire contents of which are incorporated by reference for all purposes as if fully set forth herein.

TECHNICAL FIELD

This disclosure relates to systems and methods for determining a compatibility correlation value between two or more persons. In particular, the systems and methods described herein relate to determining compatibility of two or more persons for the purpose of developing a relationship, and can be used, e.g., as part of an online dating service.

BACKGROUND

Matchmaking is a colloquial term given to the process of introducing two or more persons for the purpose of potentially developing a relationship. From the perspective of the matchmaker, i.e., a person introducing two or more acquaintances to one another, there can be a wide spectrum of involvement. At one end, where the matchmaker is substantially disconnected, the acquaintances can be introduced solely by virtue of their relationship status—for example, each acquaintance may be single and seeking a relationship. At the other, more involved end of the spectrum, considerable thought, time, and energy can be expended considering a probability that two or more people will be happy in a relationship together. Whether or not a person believes that two people would make a good couple is likely influenced by complex biological, physiological, and socioeconomic factors; to some, this leads to a simple "gut feeling" about the relationship compatibility of acquaintances.

Social media outlets such as Facebook, MySpace, LinkedIn, and others provide users the capability to define their own on-line profile, which other users can typically access, if they are given permission by the account holder. So-called "online dating" sites such as Match.com and eHarmony.com have grown in popularity in part because much of the "matchmaking" is done for the user using computer algorithms. Another reason behind the success of electronic dating sites is the capability to learn about a potential relationship partner under conditions of anonymity before meeting face-to-face. For example, users can view profiles, pictures, and other media to build an impression and ultimately determine if they are interested in the person.

Online dating sites often utilize user-fillable forms that seek to build a user profile with questions like: "How tall are you?" "What is your eye color?" "What is your faith?" "What is your level of education?" "What do you like to do in your free time?" among others. Aside from these demographic-type questions, some sites attempt to gain insight into users' personalities by asking questions relating to social behaviors, like "How often do you drink?" "What kind of movies do you like?" etc. The compiled results can then be used to match two or more people together based on similarity of the answers given.

SUMMARY

In general, according to one embodiment, a computer-implemented method for determining relationship compatibility is described. The method includes receiving data from a subject user and an acquaintance of the subject user. The data from the subject user and the acquaintance can then be used in a compatibility algorithm to determine potential personality matches.

In one exemplary aspect, a computer-implemented method for determining relationship compatibility between a subject user and one or more other users is provided. The method includes determining a compatibility match between the subject user and the one or more other users using a computational method that integrates, among other factors, input provided by the subject user and input provided, or verified by one or more acquaintances of the subject user to determine compatibility with the one or more other users. The method further includes sending the results of the computational method to an output register.

In one exemplary aspect, a computer-implemented method for determining a compatibility value between a first system user and a second system user is provided. The method includes calculating a compatibility value indicative of a range of similarity between the first system user and the second system user using an algorithm that incorporates personality input provided by the first system user, wherein the personality input is verified by one or more acquaintances of the first system user, to determine compatibility with the second system user. The method further includes sending the results of said computational method to an output register.

In one embodiment, calculating a compatibility value includes using correspondence analysis of at least the first user and the second user among a plurality of users.

In one embodiment, the range of similarity corresponds to the likelihood that the personalities of the first system user and the second system user are compatible for the purposes of forming a relationship therebetween.

In one embodiment, the method further includes generating a graphic image that is renderable on an electronic display device comprising graphical results of the correspondence analysis. In a related embodiment, the method further includes calculating the compatibility value for a plurality of other system users and generating a matrix of compatibility data that ranks personality compatibility between the first system user and the plurality of other system users.

In one embodiment, the method further includes communicating the results of the computational method to the first user and, optionally, the second user.

In one embodiment, the personality input includes one or more of: age; gender; sex; proclivities; or moral, ethical, spiritual, or political personal viewpoints.

In one embodiment, the method further includes receiving personality data associated with the first system user from the one or more acquaintances and integrating the personality data with the first system user.

In one embodiment, the method further includes generating a user profile for the first system user capable of being displayed on an electronic display device that displays the personality input and verification data supplied by the one or more acquaintances.

In one exemplary aspect, a method for measuring a compatibility value between two or more persons is provided. The method includes electronically storing a first user profile including personality information received from a first user, transmitting the first user profile to a second user for the purpose of verifying the first user profile, wherein the second user is known to the first user, receiving a verification of the first user profile from the second user to generate a verified profile of the first user, determining the compatibility value by selecting a closest match between the verified profile of the first user and a profile of a second, different user, and transmitting an electronic signal representative of the compatibility value to an output register.

In one embodiment, the user profile includes responses provided by the first user from an electronic form, the form including a plurality of questions configured to compile a substantially complete personality profile.

In one embodiment, receiving a verification of the first user profile includes receiving an indication of agreement or disagreement for each response received by the first user from the form and determining a threshold verification value based on the number of verified responses. In a related embodiment, a predetermined threshold verification value is required in order to perform the steps of determining the compatibility value by selecting a closest match between the verified profile of the first user and a profile of a second, different user; and transmitting an electronic signal representative of the compatibility value to an output register.

In one embodiment, the method further includes comparing a selected threshold compatibility value with the determined compatibility to forecast the likelihood of a successful relationship between the first user and the second user.

In one exemplary aspect, a method for verifying a user profile in an online dating service is provided. The method includes receiving a personality profile from a first user; transmitting the personality profile to a second user, wherein the second user is an acquaintance of the first user; receiving a response from the second user, the response indicating the validity of the personality profile; generating a validated user profile for the first user and determining a compatibility value with other users by comparing the validated user profile with validated user profiles of the other users; and transmitting an electronic signal representative of the compatibility value to an output register.

In one embodiment, determining a compatibility value comprises using correspondence analysis of each of the users' profiles.

In one embodiment, the compatibility value is used to select a user from the plurality of other users whose personality characteristics are calculated to be similar to the first user's personality characteristics. In a related embodiment, the method further includes receiving an indication from the first user as to the success or failure of a relationship between the first user and a second user, wherein the compatibility value was equal to, or greater than a threshold compatibility value that suggested the likelihood of a successful relationship therebetween, and using the indication to refine the personality profile of the first user in subsequent determinations of the compatibility value.

In one embodiment, the method further includes generating a validity score associated with the first user's validated user profile, wherein the validity score is commensurate with the second user's verification of the first user's personality profile. In a related embodiment, the method further includes transmitting the first user's personality profile to, and receiving responses from, a plurality of acquaintances to increase accuracy of the validity score.

Certain advantages of the systems and methods described herein include the capability of matching users based not only on their own personality profile, but also using the input of others who know the subject user, e.g., friends or acquaintances. This capability can lead to a more accurate portrayal of the subject user seeking a relationship; among others.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings in which like references indicate similar elements, and in which:

FIGS. 2A-2E show various computer-implemented screen snapshots, according to multiple embodiments;

DETAILED DESCRIPTION OF ILLUSTRATIVE EMBODIMENTS

Figure 1A:
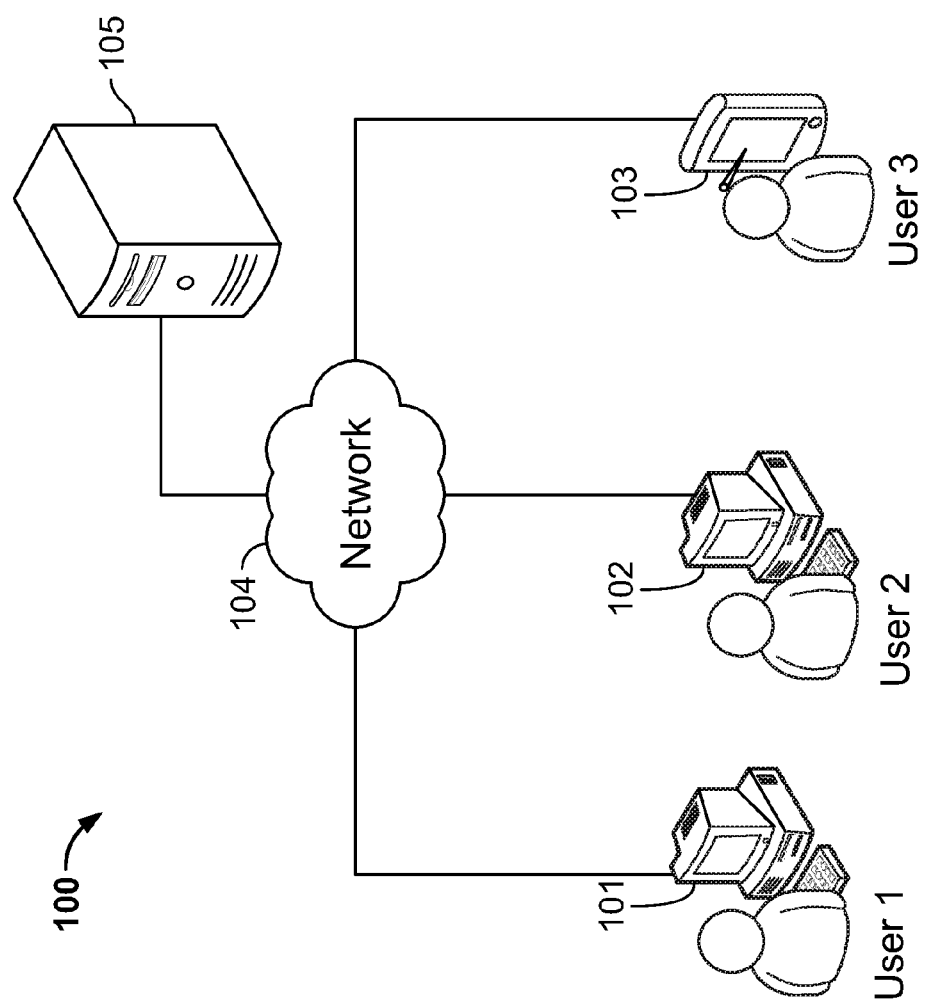
FIG. 1A is a computer-based system, according to one embodiment.

It has become common practice for users of so-called "social media" sites such as Facebook, LinkedIn, and online dating services to create an online profile that serves as a representation of themselves in the virtual internet 'world.' In some cases, however, the authenticity of such information is not checked against a reputable source. While age, marital status, and other demographic information can be verified using, e.g., public data sources, it can be difficult to authenticate less tangible user-supplied information such as: personality type, likes, dislikes, religious views, and other personal information. In some cases, which often end in tragedy, users are allowed to create deceptive profiles that misrepresent themselves, sometimes with criminal intent.

Some people genuinely believe they possess certain personality traits such as honesty, caring, humor, or fidelity, but those acquainted with them may have a different impression. For example, a person may think they have a great sense of humor, but others may disagree. In some cases, a person may be unaware of a positive or negative personality trait that they have become known for; for example, a person may not give thought to how well they interact with children or the elderly, even though that characteristic may be recognized and appreciated by others. In general, when seeking a meaningful relationship, it can be advantageous to consider the outside perspective of friends and acquaintances alone, or in combination with a person's own self-image.

This disclosure relates to computer-implemented systems and methods for determining a compatibility value between two or more users, wherein the compatibility values take into account at least the outside perspectives, input, and other data from one or more acquaintances of each user. In one general aspect, computer-implemented systems and methods are disclosed for matching personality characteristics of a first user with that of a second user for the purpose of forming a relationship therebetween. "Characteristics" can include any type of personality trait, such as "funny," "intelligent," "sincere," and others, and can also include physical characteristics such as "athletic" "blonde-haired," etc., among others.

In one embodiment, personality traits and characteristics of a user can be partially or wholly defined by one or more third-parties, i.e., acquaintances, or persons other than the user himself. In this manner, the collection of characteristics defined by both the user and third-parties can paint a more accurate portrait of the user than relying solely on his or her input, and the likelihood of finding a matching personality can be increased.

For the purposes of this disclosure, the term "subject user" refers to a person who is seeking a relationship, or whom others may know as a single person or otherwise seeking a relationship. A subject user can be, for example, a single person who uses the systems and methods described herein as part of an online dating system. The term is defined to differentiate the subject user from other users of the system, but who may be, or may become acquaintances of the subject user. Throughout this disclosure, the term "user(s)" can refer to a subject user or other users of the systems and methods, e.g., acquaintances of the subject user, or both.

Referring now to FIG. 1, a computer-based, user-matching system 100 is shown. The system 100 is capable of collecting user information for the purpose of performing matching analysis with other users, where the matching analysis includes matching, e.g., personality, age, location, interests, and other information to arrive at a compatibility value. In one exemplary embodiment, some or all of the user-supplied information can be verified by third-parties such as friends, family members, co-workers, and the like who know the user, as described in greater detail herein. In this embodiment, the system 100 includes computer-based user input devices, e.g., computing devices 101, 102, 103 which, in this example are personal computing devices being used by User 1, User 2, and User 3, respectively. It will be understood, however, that a computer-based user input device can be any type of computer-based device known in the art, such as a personal data assistant (PDA); so-called "smart" phones, such as iPhones, iPads, (both sold by Apple, Inc., Cupertino, Calif.) and the like, or cellular phones having a software operating system that allows users to send and receive information; "tablets" such as iPad (sold by Apple, Inc.); and the like. In this exemplary embodiment, User 3 is using a personal computing tablet. FIG. 1 illustrates three unique users, however, it will be understood that the system 100 can be configured to allow concurrent use by any number of users.

The input devices 101-103 are capable of sending and receiving data to and from a computer-based network 104. The computer-based network 104 can be, for example, the internet. It will be understood, however, that the network 104 can be an intranet or any other type of computer network known in the art. The network 104 can provide the capability for users (e.g., Users 1-3) to send and receive information to and from a server 105, and, correspondingly, to each other. The server 105 can be any type of computer server known in the art and includes the necessary hardware and software instructions to store personality data on users, and perform calculations to match users based on personality traits as described herein.

The following example illustrates one non-limiting use of the system 100 and methods described herein for finding a relationship partner. Consider User 1 as a single female seeking a relationship (in this example, User 1 is the subject user). Consider also that User 2 is an acquaintance of User 1. User 1 can log on to a website hosted on the server 105 that serves as an interface to the compatibility matching system described more fully herein. User 1 can provide information about herself, such as her age, demographic group, interests, financial status, or other information which data can be stored in a data repository on the server 105. User 1 can, in this embodiment, invite User 2 to substantiate the information that she provided; the substantiating information can be, e.g., User 2's perspective of User 1's personality characteristics, personal testimony, or other information. The information provided by User 2 about User 1 can be added to User 1's account or profile and stored in a repository on the server 105. The data from both User 1 and User 2 can be combined to form a global personality profile of User 1 which can be used by in calculating a compatibility value between User 1 and another user of the system 100.

User 3 can be another user of the system, for example, a male seeking a relationship with a female; he may or may not know User 1 or User 2. User 3 may have other acquaintances (not shown in FIG. 3) who have supplied their information and perspective about User 3 to similarly create a global personality profile for User 3. As described more fully below, the system 100 can be configured to calculate a measure of compatibility, e.g., a compatibility value, between User 1 and User 3 using the global personality profiles of each user. The compatibility value can be a calculated measurement of the likelihood that User 1 and User 3 would be comparable with each other, and can take into account any number of factors, including, e.g., overlapping interests, political, social, religious, moral or ethical views, success in business, level of education, sexual orientation or preference, or other factors.

The server 105 can be capable of notifying users of potential personality matches with other users of the system 100. For example, User 1 can be notified, e.g., through a website interface, text message, email, or other form of communication, that her global personality profile information matches, or has characteristics in common with User 3. In another example, User 3 may receive notice that he has common interests or characteristics with both User 1 and User 2, whom he may already be acquainted with; in such a case, User 3 can introduce Users 1 and 2, serving as a common acquaintance between the two. In one embodiment, the system 100 is capable of providing a platform on which users can introduce other users to each other according to compatibility values as described in greater detail herein.

Figure 1B:
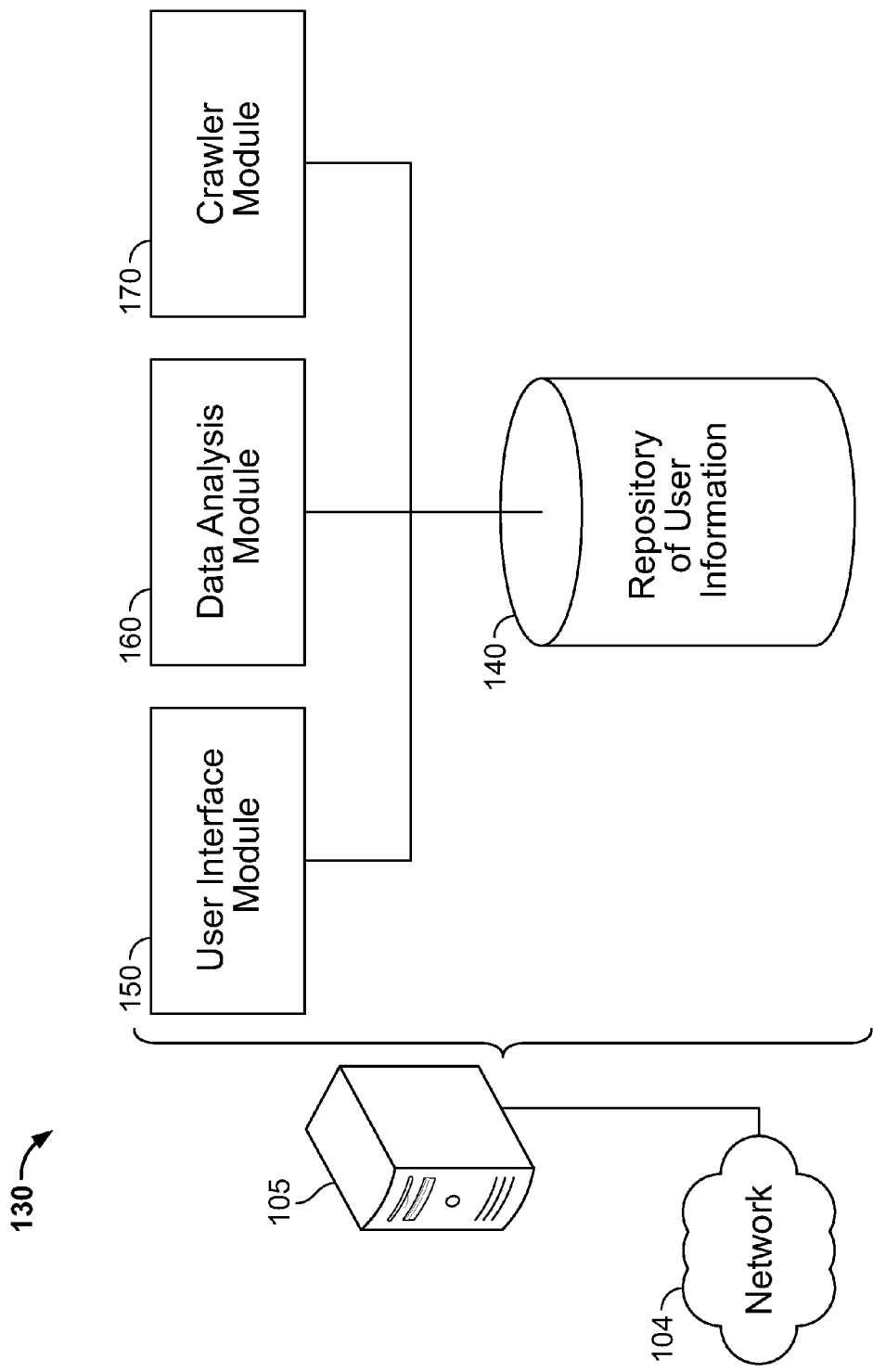
FIG. 1B illustrates selected details of the computer-based system shown in FIG. 1A, according to one embodiment.

Referring now to FIG. 1B, exemplary components of a compatibility matching system 130 are shown according to one embodiment. The components of the compatibility matching system 130 can be integral with the server 105, as illustrated in FIG. 1B by their enclosure within the curly braces. It will be understood, however, that the server 105 can include many other components, such as computer hardware, software, peripheral equipment, etc., that provide the server 105 the capability to function as a server on a computer network. Such other components will be recognized by those skilled in the art of computers and computer networking. Furthermore, the components of the compatibility matching system 130 shown in FIG. 1B are illustrative only; those skilled in the art of computer programming will recognize that this and other embodiments of the compatibility matching system 130 can be enabled using alternative methods and approaches. The server 105 is capable of executing code contained in various software modules and also storing and retrieving data.

In this embodiment, the compatibility matching system 130 (hereinafter "system") includes three modules: a user interface module 150, a data analysis module 160, and a crawler module 170; it will be understood, however, that alternative embodiments may include additional or fewer modules. The system 130 also includes a repository of user information 140. The solid line connecting each of the modules and the repository in FIG. 1B illustrate that data can flow between modules and between modules and the repository; for example, the user interface module 150 can pass information to the data analysis module 160, which, in turn, can store and retrieve information from the repository of user information 140, then pass calculated information back to the user interface module 150, etc.

In this embodiment, the repository of user information 140 can be, for example, a relational database, such as a MYSQL database. The repository 140 is capable of storing information about users in electronic form; thus, the repository 140 can store text information, graphics, such as photographs or other images, sounds, videos, and any other type of electronic data. It will be understood that, while the embodiment of FIG. 1B shows one repository of user information 140, multiple repositories can be used to store user information. This approach can be beneficial, in some cases, to reduce lag time associated with searching a database containing large amounts of data, as those skilled in the art will appreciate. Furthermore, in some embodiments, the repository of user information 140 can be spread over multiple servers; or multiple repositories can be spread over multiple servers.

In this embodiment, the system 130 includes a user interface module 150. The user interface module 150 can perform functions to cause a system 130 user interface to be displayed on a user's computing device. For example, referring back to FIG. 1A, the user interface module 150 can provide software code that causes a website interface to be displayed on User 1's computer terminal 101, or User 3's computing tablet, using a web browser or other software implementation. In a preferred embodiment, the user interface module includes HTML or other web-based language commands, scripts, and other instructions that allow a user to provide information to, and receive information from the system 130. In one embodiment, the user interface module 150 can provide a user interface on a mobile device, such as a network-ready mobile phone, personal data assistant, tablet, or other portable computing system.

In this embodiment, the user interface module 150 can provide a user one or more forms to fill out for the purpose of collecting personality and other information. In some embodiments, the forms can be static, e.g., they can ask a series of pre-determined questions for the purpose of constructing a virtual 'portrait' of a user's personality. In some embodiments, the forms can be dynamic, where the answer provided to one form question can prompt a new question to hone in on a particular personality trait. For example, a first form question may ask "Do you like animals?" which can be answered using a 'yes' or 'no' checkbox; if the user checks 'no,' no further refinement of the question may be necessary. However, if the user selects 'yes,' additional form statements and/or questions can appear, such as "You like animals! Do you have pets?" followed by a yes/no checkbox or other input field. In this embodiment, such additional questions can be configured to ultimately discover the user's preference in animals, or level of interest in same, which can, in part define the user's personality. For example, further questions may reveal that the user has a fondness for puppies (which may indicate one personality type) while for another user, the same refinement method may reveal that they have a fondness for poisonous spiders (which may indicate another, different personality type). This refinement process can be implemented through, e.g., forms using HTML, XML, Javascript, PHP, ASP, or other software languages capable of displaying dynamic content in, e.g., a web browser interface.

In this embodiment, the user interface module 150 can provide user login/logout capability to the system 130 and other administrative functions such as user registration, accepting payment for service fees, etc.

In this embodiment, the data analysis module 160 is capable of performing calculations for predicting a compatibility value, e.g., the likelihood of a successful relationship between one or more users, the details of which are described in greater detail below. In one embodiment, the data analysis module 160 can compute a compatibility score using correspondence analysis. The compatibility score can be a measurement of the likelihood that two or more users will form a successful relationship. The data analysis module 160 can access user information stored in the repository 140 and perform calculations based on predetermined criteria for finding two or more users with similar personalities, styles, or other traits, for the purpose of predicting the likelihood that the users will enjoy each other's company. In preferred embodiments, the user information stored in the repository 140 includes not only user information provided by the subject user, but also by acquaintances of the subject user.

In one embodiment, the calculations performed in determining a compatibility value can be refined by measuring the success of relationships that were suggested by the system. For example, referring back to FIG. 1, the system 100 may have calculated a high compatibility factor between User 1 and User 3. In some embodiments, the system 100 can receive input from users indicating that they have met and begun some form of relationship with a suggested user, e.g., through dating or long-term relationships. Thus, in this example, the system may prompt User 1 or User 3, or both, asking "Are you still in a relationship with [User 1 or User 3]?" If the system 100 receives an affirmative answer, those data can be used to positively affirm and refine the algorithms used to determine a compatibility value as described herein. Likewise, if the users' relationship did not work out, the system 100 can pose questions to either user, or both, to seek out one or more reasons for the failed relationship. For example, in one embodiment, the system 100 can pose a question such as "If you had to pick three reasons that your relationship did not work out, what would they be?" The question could, in one embodiment, be followed by a series of potential reasons, such as different philosophical views, difference in political views, difference in educational levels, etc. In one embodiment, the system 100 can feed such information back into the user's profile. For example, if a user indicates that their relationship failed because of differences in political views (especially if this indication is received more than once), the system may conclude that the user is highly involved in politics, or has strong political viewpoints. Such information can be used by the system 100 to seek other users with similar interest or passion in politics, for example.

In this embodiment, the crawler module 170 includes software instructions for seeking information about a user and adding that information to the user's profile, if a profile exists. For example, the crawler module 170 can search social media sites for user information. Consider, for example, that a subject user of the system 130 has a Facebook account, and the subject user allows the system 130 to access that account for the purpose of collecting personality information. The crawler module 170 can collect certain information such as the subject user's favorite music and bands, authors, movies, among others. Furthermore, the system 130 can collect information about the subject user's acquaintances, such as contact information for Facebook "friends" and other information. In one embodiment, the system 130 can use this information to request input about the subject user from the friends, for the purpose of developing a more complete portrayal of the subject user. For example, the system 130 can send an email or other notification to acquaintances, indicating that the subject user is seeking a relationship and requests their input in creating a personality portrait.

In one exemplary aspect, the system 130 can be used to provide a "reference-based" online dating website, where users can register a subject user acquaintance, provide input about them, and provide the opportunity for the subject user to meet other users of the system 130. For example, Sheila (a fictitious user of the system 130) may have a friend John (the subject user) who is single and looking for a relationship. To assist her friend in finding a suitable partner, Sheila may create an account for John on the system 130 by providing information about him, such as his physical characteristics, personality type, whether he has been married previously and other traits. She may also upload pictures, videos, or other types of media about John so as to create an accurate virtual representation of him.

Sheila may feel that John is an outstanding person worthy of a great relationship—and that others may feel that way too. As such, Sheila can invite other friends to contribute to John's profile, so that when users of the system 130 view John's profile, they can see that he is generally liked by more than one person, or that more than one person believes that he possesses certain positive personality traits. This process can lead to an increased sense of security for those viewing John's profile for the purpose of forming a relationship, in part, because multiple users have vouched for the validity of John's profile, and also in part because multiple users may agree on certain of John's personality traits. This process can also lead to reduced nefarious use of the system by subject users pretending to be someone else, as the subject user would have to create multiple bogus user accounts to build up references.

Without wishing to be bound by theory, it can be assumed that it is human nature to feel more comfortable and accepting of an unknown person—especially when considering entering into a relationship with that person—if there is a commonality between acquaintances. Thus, when the above example is extended to include multiple users, each providing input on his or her acquaintances seeking relationships, a network of commonality can be formed which can lead to both increased chances of finding potential matches for friends, and an increased feeling of comfort and security knowing that the matchmaking process was performed by known acquaintances.

Referring now to FIGS. 2A-2E, exemplary screen snapshots of a system user interface are shown, according to multiple embodiments. Reference is made to FIGS. 1A and 1B with respect to the system 130 to illustrate the flow of information from the user interface to the different modules described above; however, other suitable systems configured to perform the same or similar functions can be used. Any or all of the exemplary screen snapshots shown in FIGS. 2A-2E can be provided by, e.g., the system 130 user interface module 150 described with respect to FIG. 1B, or by other methods known in the art. It will be understood that the exemplary screen snapshots of FIGS. 2A-2E can be displayed on a computer screen, such as a desktop or laptop computer screen, a mobile device such as a cellular phone, a tablet device, or any other computing device having a screen component capable of displaying content to a user.

Figure 2A:
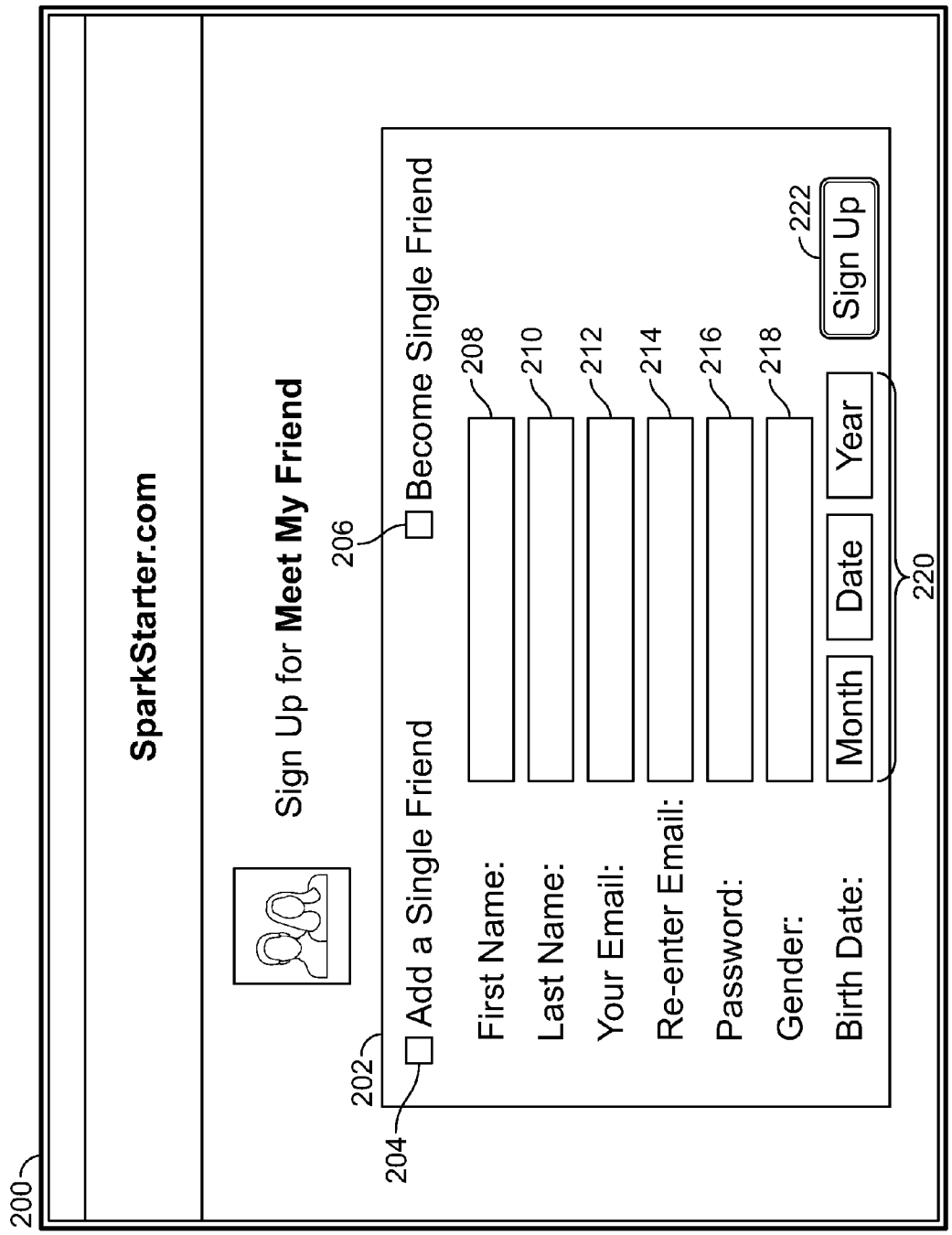

Beginning with FIG. 2A, an exemplary screen snapshot 200 is shown, according to one embodiment. Screen snapshot 200 can be a "welcome" or "landing" page that allows users to fill in information in various fields so that information can be uploaded to a server, e.g., server 105 described with respect to FIGS. 1A and 1B. The screen snapshot 200 shows the title "Sign up for Meet My Friend" (a fictitious name for the service provided by the system 130), and a user input section 202 beneath where user input can be collected. Checkbox 204 can be selected when, for example, a user is adding a friend for the purpose of finding them a relationship partner. In the fictitious example described above, "Sheila" would click the "Add a Single Friend" checkbox 204 to create a profile for John, her subject user acquaintance. Alternatively, checkbox 206 can be selected if the user is the person seeking a relationship partner—i.e., if they are the subject user. Keeping with the above example, John could select checkbox 206 to begin building his own profile.

In this embodiment, the user input section 202 further includes form fields for the purpose of collecting user information, such as the user's first name (208), last name (210), email (212) and email verification (214), a password (216), the user's gender (218), and a series of input fields to collect the user's date of birth (220). The password field 216 can be a password already provided to allow access to the system or can be a desired password to allow future access to the system, as is customary in many web-based user registrations systems. The "sign up" button 222 can be a button used to send the user-supplied form information to the system 130; depending on the type of information supplied, the user interface module 150 can perform appropriate functions, such as sending a message indicating the user is now registered, or allowing further access to the functionality of the system 130. In the case of creating a new account, the user interface module 150 can store the user information in the repository 140. In one exemplary embodiment, the user interface module 150 can create a new table in a mysql database that can store current and future information pertaining to the user.

Referring now to FIG. 2B, an exemplary screen snapshot 224 is shown, according to one embodiment. The screen snapshot 224 can be one which is displayed, for example, after the user clicks the "Sign Up" button 222 described in FIG. 2A. The screen snapshot 224 includes a section entitled "My Single Friend's Details" 226 where a user can enter information pertaining to an acquaintance seeking a relationship (the subject user). In this example, the user can enter the subject user's first name (228), last name (229), email address (230), and email verification (231) in the fields provided. A text box 232 is provided so that the user can describe the subject user freely, i.e., without being prompted by specific questions, or choosing yes/no responses to closed questions, for example. In some embodiments, the description that the user enters in the text box 232 can be used to build a table of keywords to generally describe the subject user; the description can also be scanned for certain keyword or catch-phrases such "family," "employed," "nice," etc. which can be used when building a searchable index of words relating to the subject user.

Referring now to FIG. 2C, an exemplary screen snapshot 236 is shown, according to one embodiment. The screen snapshot 236 can be one which is displayed, for example, after the user clicks the "Next" button 234 illustrated in the screen snapshot of FIG. 2B. This screen snapshot can be an interactive form provided by the system 130 to gather additional details about the subject user. The screen snapshot includes web-based form fields in the "Additional details" section 238 which can be similar to the form fields described above with respect to FIGS. 2A and 2B, and which those skilled in the art will recognize. In general, the Additional Details section 238 can provide the capability to gather additional detailed information about the subject user, including demographic information, age, education, etc., and also personal habits or behaviors, such those relating to drinking, smoking, etc. The "Next" button 240 can send the information inputted into the form to the server 105 where the system 130 can store the information.

Figure 2D:
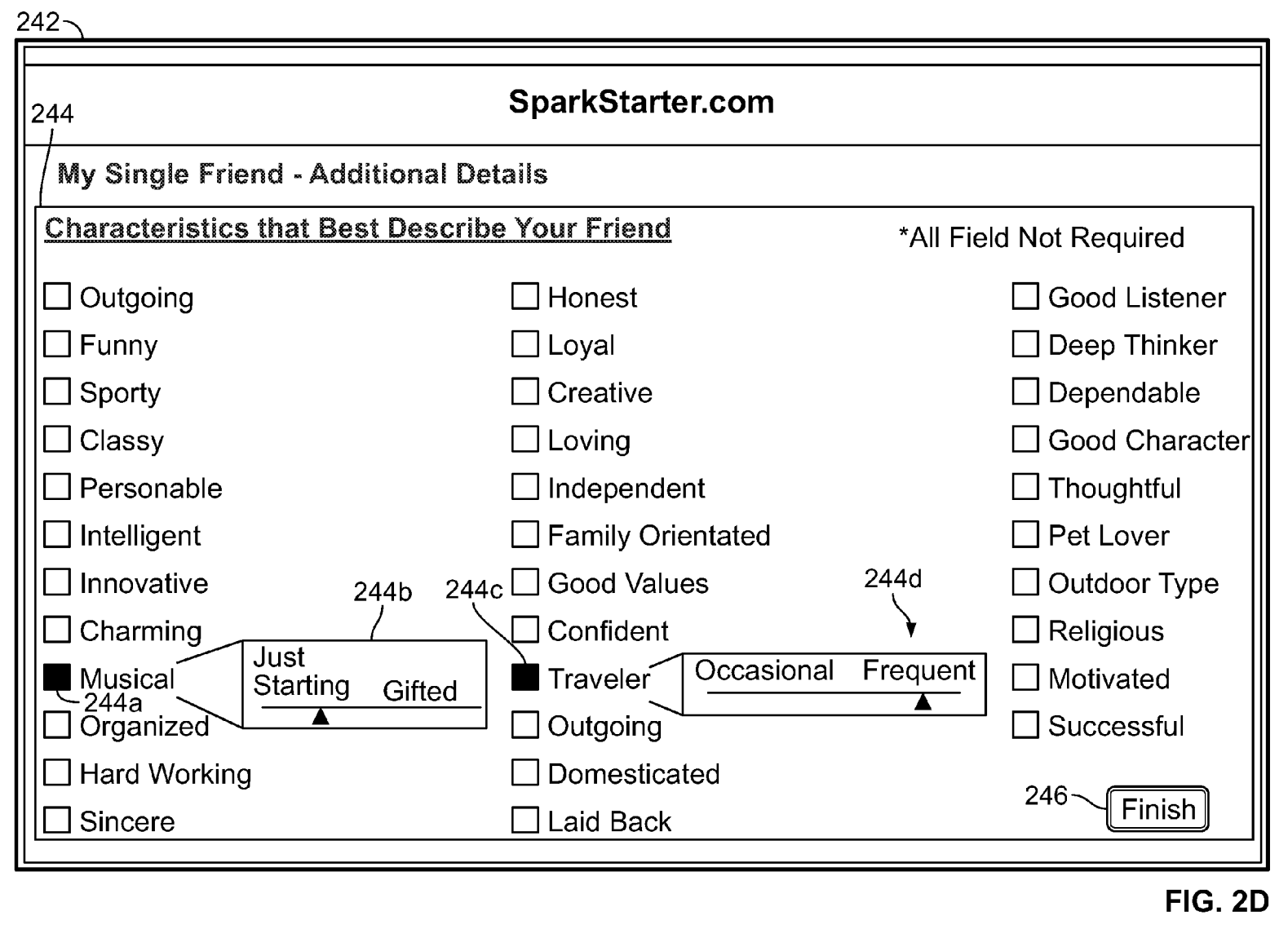

Referring now to FIG. 2D, an exemplary screen snapshot 242 is shown, according to one embodiment. The screen snapshot 242 can be one which is displayed, for example, after the user clicks the "Next" button 240 illustrated in the screen snapshot of FIG. 2C. This screen snapshot can be an interactive form provided by the system 130 to gather additional details about the subject user. The screen snapshot includes fillable form fields in the "Additional details" section 244 which can be similar to the form fields described above, and which those skilled in the art will recognize as self-explanatory. In general, the "Additional Details" section 244 asks the user to select characteristics that best describe the subject user. Some of the exemplary choices shown include, but are not limited to: outgoing, funny, sporty, classy, etc. In some embodiments, selecting one of the checkboxes can cause additional form fields to appear which further refine the question or offer the ability to add supporting information or rate the characteristic as measured against other acquaintances. For example, in this exemplary screen snapshot, the user has selected the "Musical" attribute (as illustrated by the darkened checkbox 244a). This has caused a sliding scale 244b to appear which lets the user rate the musical ability of the subject user, spanning a spectrum from "Just Starting" to "Gifted." Similarly, the user has also selected the "traveler" checkbox 244c, which has caused a sliding scale 244d to appear, which lets the user select how often the subject user travels, on a scale from "occasional" to "frequent." In general, such interactive "pop-up" screen components such as sliding scales 244b and 244d can be integral with any desired checkbox in order to further refine a personality characteristic of a subject user. Those skilled in the art will recognize that other programmatic approaches can be employed to arrive at the same or similar functionality, such as through the use of drop-down boxes. In general, data inputted via a pop-up screen component can be appended to the parent data of the form. For example, the form field data for the "Musical" checkbox can be sent to the server as "Musical:Just Starting". The "Next" button 246 can send the information inputted into the form to the server 105 where the system 130 can store the information.

Figure 2E:
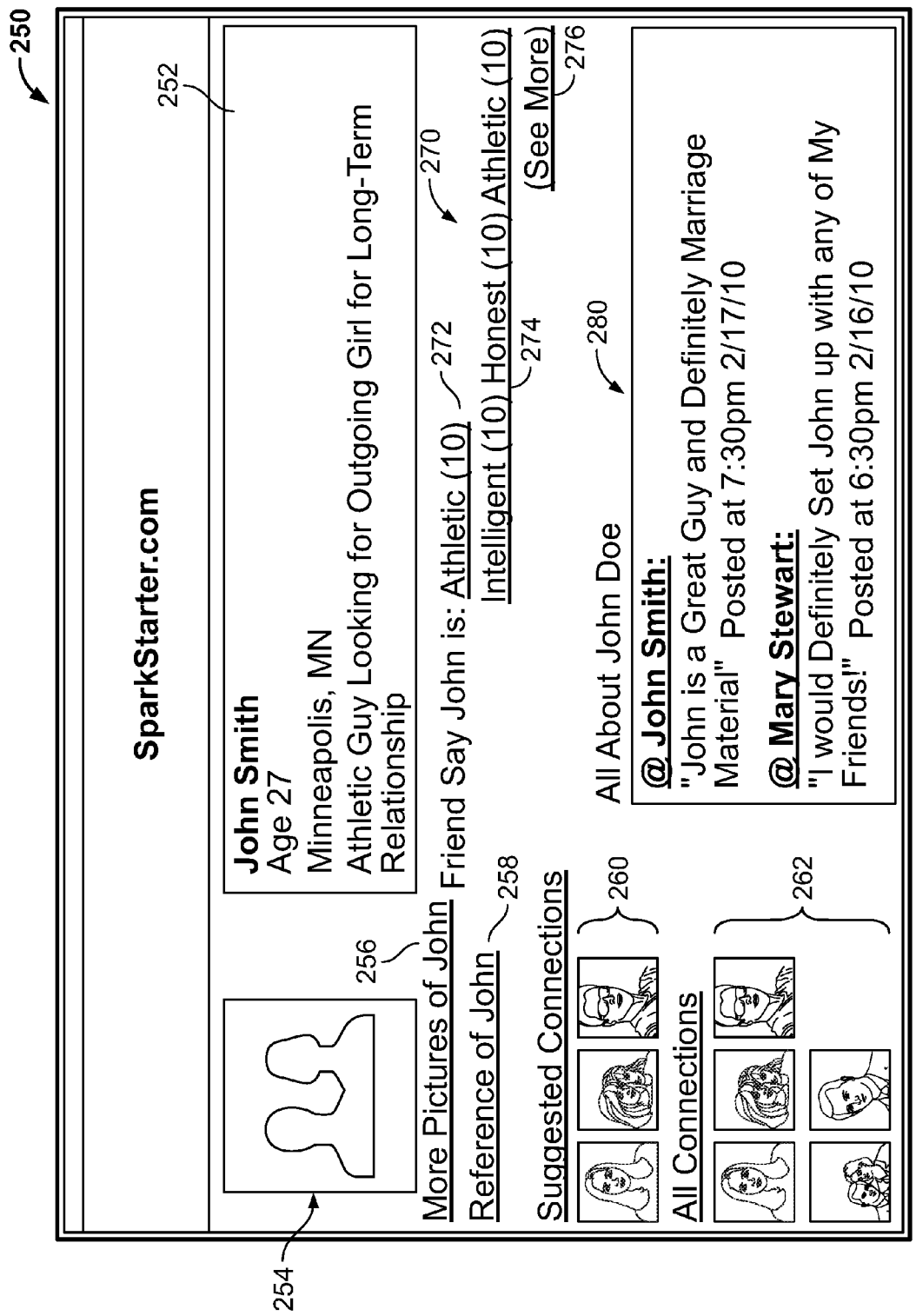

Referring now to FIG. 2E, an exemplary screen snapshot 250 is shown, according to one embodiment. This screen snapshot 250 has several sections and shows a summary of the subject user, as well as data collected about the subject user from one or more acquaintances. In this example, a basic information section 252 includes the subject user's name (John Smith), age, location, and a one-sentence description, which may have been provided by the subject user, or the subject user's acquaintance(s). Photograph 254 can display a picture of the subject user, and links below the picture can lead to more photographs (link 256) or the subject user's references (link 258).

In this embodiment, a summary section 270 can show aggregate information about the subject user that has been compiled from input by acquaintances of the subject user. The summary section 270 can reveal commonly chosen personality characteristics of the subject user as selected by the subject user's acquaintances. In this example, consider that John has ten friends who have inputted their perception of John's personality. This can be accomplished using the system 130, for example, when John's acquaintances fill out and submit the interactive personality forms, such as those shown in the screen snapshots of FIGS. 2B-2D. Of the ten respondents, all ten of John's friends say that he is athletic, as indicated by the number 10 in parenthesis next to that particular characteristic; link 272 can lead to a web page that includes commentary from John's friends as to why they chose that particular characteristic, or give examples of John's athleticism, for example. Similarly, all ten of John's friends believe him to be intelligent and honest, as illustrated by the text of link 274.

In general, the numerical results shown next to the aggregate results, e.g., link 272 and link 274 can be expressed in any desired fashion. For example, the number in parenthesis can be the absolute number of responses selected for a particular trait (e.g., ten people believe John to be athletic), or the number can be expressed as a percentage or ratio of respondents having chosen that trait, e.g., 100% of respondents, 10/10 respondents, etc. The summary section 270 can include aggregate information that can be perceived as a positive indicator of the user's personality, such as 100% of respondents believing John is honest; however, aggregate information can also show results that may lead one to form other opinions. The "See More" link 276 can lead the user to a web page that shows other aggregate data about the subject user, including testimonials or other input provided by acquaintances.

In this embodiment, an "all about" section 280 can include testimonials about the subject user as provided by acquaintances. The authors of the testimonials can be displayed and hyperlinks can allow the user to contact them directly to gather more information about the subject user.

In this embodiment, a "Suggested Connections" section 260 shows thumbnail images of potential relationship partners, which can be other users of the system 130. In this embodiment, the potential relationship partners have been determined by the system 130 to be compatible with the subject user. A process by which the system 130 can determine compatibility between the subject user and other users is described in greater detail below. In this embodiment, the thumbnails can be hyperlinks to other users' profiles, thus providing the capability for users to view potential relationship partners.

In this embodiment, an "All Connections" section 262 includes thumbnail images of all of the user's friends and acquaintances, and other users that the user may not know; the user can view other users' profiles by, e.g., clicking on a thumbnail image of a selected user, which can bring them to the user's profile page.

Figure 3A:
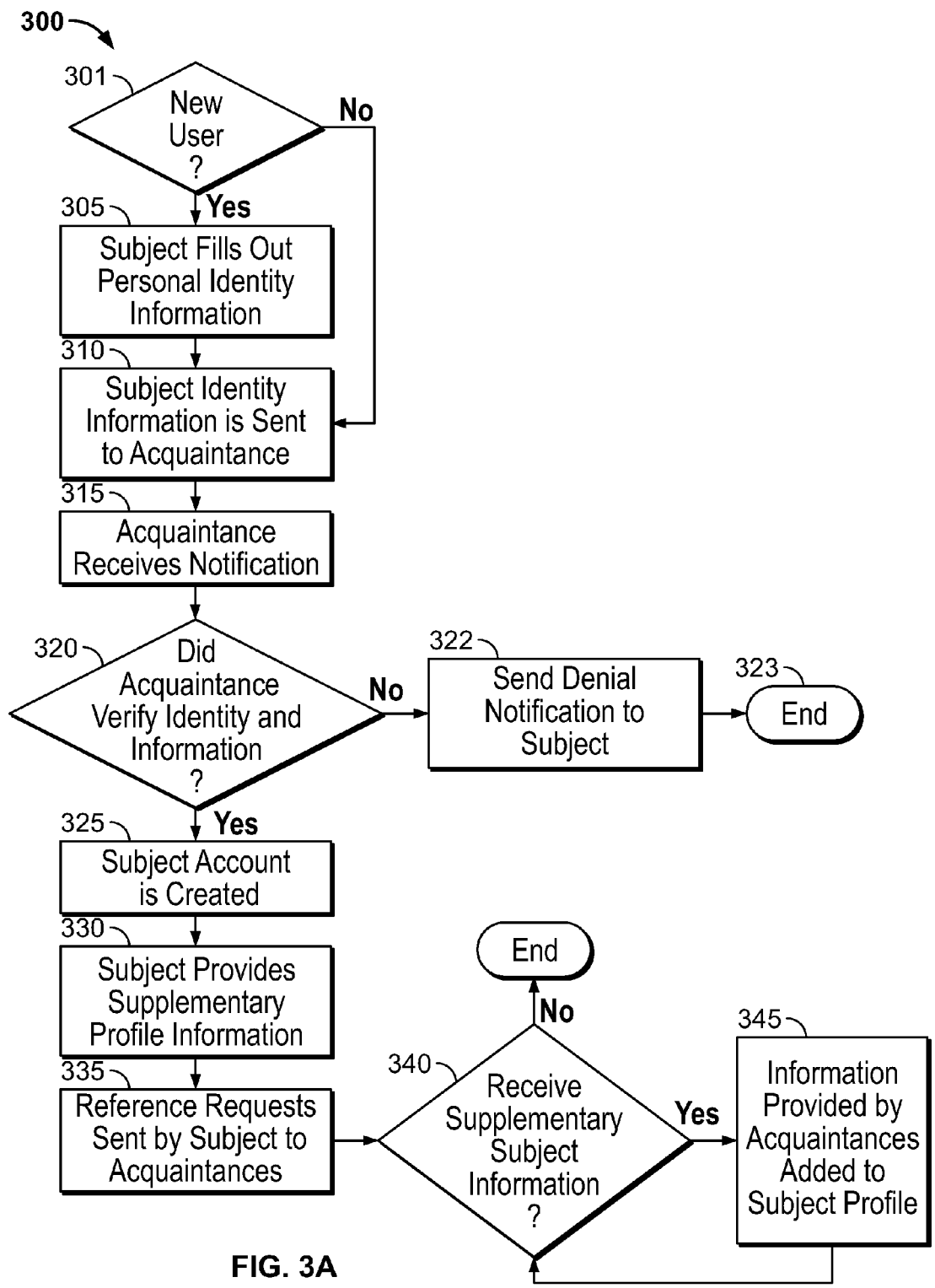
FIG. 3A shows a method for creating a subject user account, according to one embodiment.

In one general aspect, methods for creating subject user profiles are disclosed. Referring now to FIG. 3A, a method 300 for creating a subject profile is shown, according to one embodiment. In a preferred embodiment, the method 300 can be used by a subject user to create his or her profile. Profiles created by the methods disclosed herein can be used for the purpose of determining relationship compatibility with other users who have created profiles of the type described herein, and can be used by any of the systems described herein, e.g., system 130 described above.

In this embodiment, beginning at step 301, a subject user can be presented with a log on screen asking whether the subject user is a new subject user or a registered subject user. If the subject user is a new subject user, the method proceeds to step 305, where the subject user can enter personal identification information, such as the name, the city they live in, their age, etc., similar to the exemplary landing page shown in FIG. 2A. In this embodiment, if the subject user is a registered subject user, the method skips to step 310, bypassing the registration process.

In this embodiment, the next step 310 includes sending the subject user's identifying information entered in step 305 to one or more acquaintances for the purpose of verifying the subject user's identity. The one or more acquaintances can be, e.g., existing users of the system, e.g., system 130; alternatively the one or more acquaintances can be sent an email or other notification requesting that they register on the system. In this embodiment, next, at step 315, the one or more acquaintances receive the identification notice referred to in step 310.

In this embodiment, the next step is decision 320 which asks whether the one or more acquaintances can verify the identity of the subject user. In general, this step can reduce the likelihood of users providing false information, which can be a common occurrence in so-called "online" dating services. If the one or more acquaintances do not or cannot verify the information provided by the subject user, the subject user can be sent a denial of service notification (step 322), and the registration process for the subject user can end (step 323). However, in this embodiment, if the one or more acquaintances verify the information the subject user provided, step 325 can be executed, whereby an account is created for the subject user.

In this embodiment, the next step 330 includes the subject user providing information to supplement the identifying information provided in step 305. The information that the subject user supplies in this step can be, for example, answers to the queries shown in FIGS. 2B-2E (it will be understood that although the queries shown in FIGS. 2B-2E are formatted for use by a subject user's acquaintance, the same or similar queries can be answered by the subject user).

In this embodiment, the next step 335 includes sending requests to one or more of the subject user's acquaintances for information to supplement the subject user's profile. The one or more acquaintances can be, e.g., existing users of the system. An exemplary user interface for the one or more acquaintances is shown in FIG. 2D which can be used for the purpose of inputting supplementary subject information.

In this embodiment, the next step is decision 340 which asks if supplementary information has been received by the one or more acquaintances of the subject user. Supplementary information submitted by the one or more acquaintances of the subject can be received by the system at any time after the request by the subject user has been made. In this embodiment, if information is subject user information is received by the system, that information can be added to the subject user's profile, at step 345.

Figure 3B:
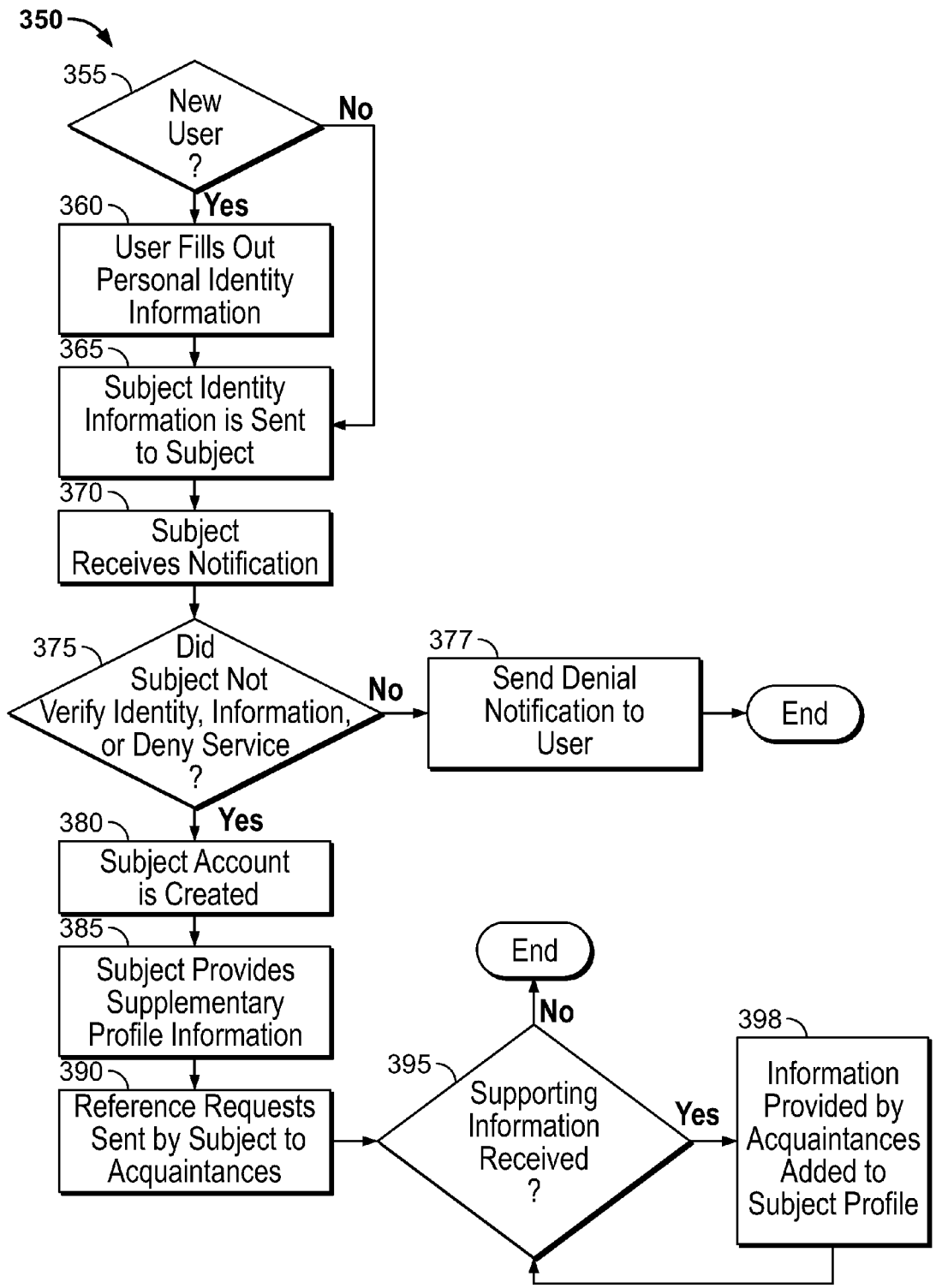
FIG. 3B shows a method for creating a subject user account, according to one embodiment.

Referring now to FIG. 3B, a method 350 for creating a subject user profile—as initiated by an acquaintance of the subject user—is shown, according to one embodiment. This method can be used, for example, when an acquaintance knows that a subject user is seeking a relationship, and the acquaintance wishes to suggest that the subject user use the system to find a compatible relationship partner.

In this embodiment, beginning at step 355, the user can be presented with a login or landing page similar to that shown in FIG. 2A, which asks whether the user is a new or existing user, i.e., a user with a pre-existing account. In this embodiment, if the user is a new user, the user can fill out personal information, e.g., name, email address, username, etc., of the subject user (step 360).

In this embodiment, the next step 365 includes sending the information from step 360 to a subject user. In one example, the subject user can receive a message (step 370) stating that an acquaintance is suggesting they use the system to find a relationship partner, such as: "Your friend Sue would like to sign you up for 'Meet my Friend'. Would you like to accept?" The message can include, e.g., a hyperlink that directs the subject user to the system, or other instructions for creating an account, similar to the method described with respect to FIG. 3A.

In this embodiment, the decision at step 375 includes determining whether the subject user confirms his or her identity, as provided by the acquaintance; or whether the subject user wishes to deny the suggestion and service provided by the acquaintance. If the subject user wishes to deny the service, a denial notification can be sent to the acquaintance (step 377) and the method can end.

In this embodiment, if the subject user accepts the invitation, step 380 includes creating a subject user account. In this embodiment, the next step 385 includes receiving supplementary information about the subject user. For example, the subject user can add information about himself, including likes, dislikes, personal preferences, etc., similar to that described above.

In this embodiment, the next step 390 includes sending reference requests to the subject user's acquaintances. Similar to that described above, this step can include gathering information from acquaintances about the subject user which can supplement and, in some cases, endorse, or recommend the subject user, or affirm the statements made by the subject user in his or her profile. In one example, a subject user may have described himself as 'honest.' Step 390 allows acquaintances of the subject user to affirm this statement, provide supporting examples, or, in an unfortunate circumstance, disagree that the subject user possesses that quality. In this embodiment, any such information received, including other information (step 395) it can be added to the subject user's profile (step 398); otherwise the method can end.

In general, according to one aspect, the systems and methods described herein can be used, in part, to create subject user profiles and perform compatibility comparisons with other users for the purpose of dating. In general, a computational method for performing user compatibility comparisons and matches can include the use of correspondence analysis to determine compatible users.

In one exemplary aspect, a video-based interviewing process can be integrated into the system 100 described above. For example, an interview panel, which can include one or more acquaintances, or, optionally one or more non-acquaintances, or a combination of acquaintances and non-acquaintances, can interview the subject user. The interview can be recorded, e.g., to a computer-readable medium such as a hard drive or other storage medium, so that other users can retrieve the recording and watch it at their discretion. The interview can include questions directed at the user regarding a range of topics as selected by the panel, and can include, in some cases, questions about the user's past personal life as known by one or more of the panelists.

In one embodiment, the panel can use the interview as a method for determining compatibility with another user. For example, the panel can recommend that the subject user be put in contact with one or more other users of the system based on the results of the interview. In one non-limiting example, an interview can be conducted between the subject user and the panel using videoconferencing software and systems known in the art.

In one embodiment, interview process can include one or more of the following steps. First, a subject user creates his or her profile on the system, e.g., system 100. Next, the user can schedule an online interview with expert(s) panelist(s) using a video interface such as that provided by, e.g., Skype (Skype Technologies, Luxembourg City, Luxembourg). Next, the panel can interview the subject user as described above. The panel can then fill out a user profile based on the subject user-supplied information and the information gleaned from the interview. Next, the panel-developed profile can be uploaded to the system 100 so it is accessible by other users. Next, the subject user's profile can be matched with similar user profiles, in some cases, depending on certain criteria. For example, the subject user may wish that his or her profile only be accessible to other users who have undergone a similar panel interview process.

In general, correspondence analysis can be used as a tool for displaying or summarizing a set of data in two-dimensional graphical form. It can be a multivariate statistical technique conceptually similar to principal component analysis, but applicable to categorical, rather than continuous data. Correspondence analysis (including its extension, multiple correspondence analysis) can be used to determine a least-squares distance between different categories of variables and between individuals. The least-squares distance can be a measure of the strength of association between the variables or individuals, where a large least-squares value can indicate lesser association strength, and vice-versa. The associations can be represented graphically on a two-dimensional map to visualize the data. In general, the use of correspondence analysis can be used in the systems and methods described herein to determine associative strength between two or more users—a statistical value—which can be interpreted as an indicator for relationship success or compatibility between the users—a more abstract value. In general, correspondence analysis can be used in the systems and methods described herein to calculate a compatibility value as described herein.

Example

Correspondence Analysis

The following example illustrates, in one embodiment, the use of correspondence analysis for determining relationship compatibility. In the following example, data from the input of users, such as subject users and acquaintances of the subject users, are utilized. The data can be collected, e.g., through use of a system as described herein, e.g., system 130. This example also illustrates some of the computational functions of the data analysis module 160 described with respect to FIG. 1.

Referring now to Table I, the results of a correspondence analysis for 10 fictional users are shown, according to one embodiment. Table I includes several sub-tables, each identified by a heading title, e.g., the first sub-table is titled "Raw User Input," the second sub-table "Row Profiles," etc. The Raw Input sub-table includes a first column containing the names of the fictional users; in this example, "Tony" is the subject user, and the other users, e.g., Amanda, Kristin, Erica, etc., are others users of the system. The first row includes personality attributes, such as athletic, outgoing, intelligent, etc. The numbers corresponding to each person in the table reflect the percentage (expressed as a decimal) of respondents that indicated the person possessed the indicated personality attribute. For example, 3.5% of respondents thought that Tony was athletic; 5% thought he was outgoing, etc.

In this example, the row profile represents the percentage of the each row personality attributed compared to the total row attributes. In this case since the contingency table is expressed as a percentage, the row profile is equivalent to the same percentage.

In this example, the "Column Profiles" sub-table represents the percentage of column attributes compared to the total column attributes.

In this example, the "Expected Frequencies" sub-table represents the number of occasions on which an event may be presumed to occur on average in a given number of trials. To find the expected frequencies, the independence of the rows and columns can be assumed. To arrive at the expected frequency corresponding to a specific trait (e.g., 0.46 for Athletic), the total from the column in the contingency table can be multiplied with the total of the row in the contingency table for each trait (e.g., 1.0 for Athletic), the result can then be divided by the number of subjects, e.g., 10 subjects in this example, resulting in an expected frequency for "Athletic" of 0.046).

In this example, the "Observed—Expected Frequencies" sub-table represents the difference between the observed and expected frequencies. In this example, the "Chi-Square Distances" sub-table represents the distance determined in the difference of the distance in two rows, and the difference between two columns. The Chi-Squared test is well defined in mathematical literature and thus is not fully described here in detail. In this example, the weighted Euclidean distance is used to measure and thereby graphically depict the distances between profile points. In this example, the weighting refers to differential weighting of the dimensions of the space and not to the weighting of the profiles.

In this example, the "Relative Inertias" sub-table represents each trait's inertia divided by the total inertia. In the Chi-Squared test, a centroid is defined (e.g., the average profile) and a distance (Chi-square distance) between profile points is calculated. Each profile point contributes to the inertia of the whole data space and thus the relative inertia is computed by each individual inertia value divided by the total inertia.

In this example, the "Analysis of Contingency Table" sub-table represents the decomposition of the total inertia. In this example, the table gives a summary of the decomposition of the 10×5 contingency table into 4 components. The column labeled "Inertia" contains the chi squared/n value accounted for by each component. Of the total inertia, 81.7% is accounted for by the first component, 16.7% by the second component, and so on. Here, 0.1396 is the chi squared statistic obtained when performing a chi squared test of association with this contingency table.

In this example, the "Row Contributions" sub-table represents a summary of all the contributions from Row Profiles.

The column labeled "Qual" (quality), is the proportion of the row inertia represented by the two components. For example, the rows "Erin" and "Amanda," with quality=1.000 and 0.985, respectively, are best represented among the rows by the two component breakdown, while "Ashley" has the poorest representation from Row Profiles, with a quality value of 0.779. The column labeled "Mass" has the same meaning as in the Row Profiles table, e.g., the proportion of the class in the whole data set. The column labeled "Inert" is the proportion of the total inertia contributed by each row. Thus, Amanda contributes 17.5% to the total chi squared statistic. Next, the column labeled "Coord" yields the principal coordinates of the rows. The column labeled "Con" represents the contribution of the component to the inertia of the row. Thus, Component 1 accounts for signification inertia of Tara and Amanda (Con of 0.970 and 0.961, respectively), but explains little of the inertia for Sarah (Con=0.057). The label "Contr", the contribution of each row to the axis inertia, shows that Erica and Amanda contribute the most, and Ashley the least for Component 1, with Sarah contributing the most and Tara the least to Component 2.

In this example, the "Column Contributions" sub-table represents the contributions for Column Profiles from the contingency table. The analysis can be the same as above for the "Row Contribution" except that it can be specific to the columns of data.

Figure 4:
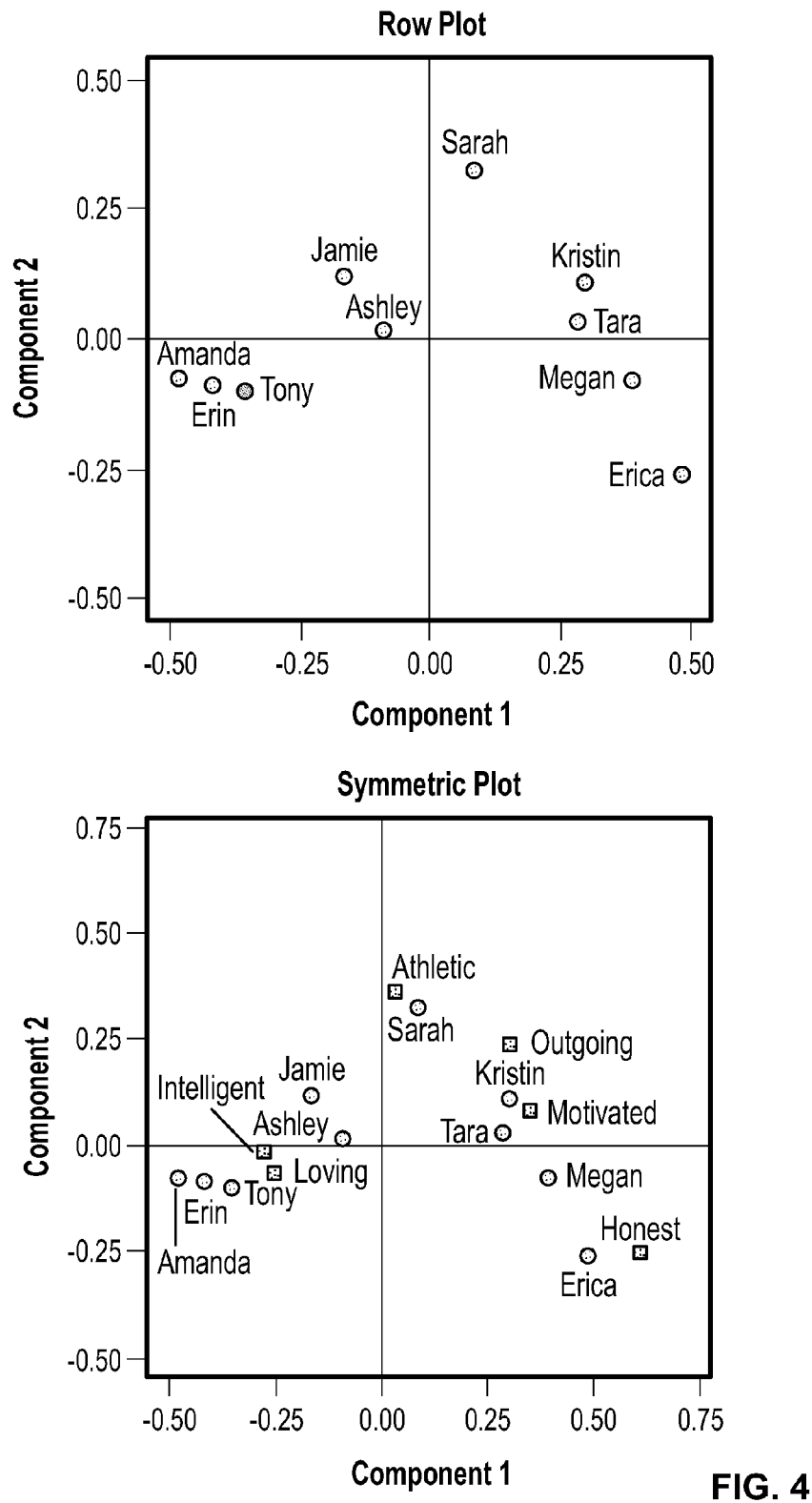
FIG. 4 shows two variations of a compatibility chart, according to one embodiment.

Continuing the example, and now referring to FIG. 4, the results of the correspondence analysis are shown, according to one embodiment. (The results of the correspondence analysis are also displayed in tabular form in Table 2.) In general, the chart can provide a simple and intuitive method for determining compatibility between users, based on coordinate proximity. Referring specifically to the Row Plot in FIG. 4, in this example, and using the input of other users, Tony's personality profile places him in the fourth quadrant of the plot, with Erin and Amanda. Referring also to Table 2, the least square distance between Tony's position on the plot and Erin's position on the plot is 0.0653; from a coordinate perspective, Erin is the closest user to Tony, which can indicate that of all users, Erin is most compatible with Tony. Accordingly, the second-most compatible user with Tony can be Amanda, then Ashley, and so on; Erica, who is the furthest distance from Tony on the plot, may be the least-compatible. Referring specifically to the Symmetric Plot in FIG. 4, in this example the chart shows the relationship of key traits, identifying that "Loving" and "Intelligent" are key traits for Tony and showing the corresponding relationship to others.

In this example, the best-match M between subjects is calculated according to: $M=\sqrt{((C1-CX)^2+(C2-CY)^2)}$, where C1 is component 1 for the target, C2 is component 2 for the target, CX is the coordinate for any of the users being compared in component 1, and CY is the coordinate for any of the users being compared in the component 2 direction.

The above example illustrates, in one embodiment, how a system and method as described herein can be used to determine compatibility between a subject user and other users of the system. As illustrated, the computational procedure for determining compatibility includes using input from other users about the subject user, not just information the subject user provides about him or her.

In general, a subject user's account can have a landing- or homepage, similar to some social media sites such as Facebook, Twitter, or LinkedIn. The landing page can show a summary of the subject user's account, profile, and information about the subject user as provided by others. This information can be presented in a variety of forms that can depend on style, functionality, and other factors that will be apparent to those skilled in the art of HTML programming, databasing, and similar disciplines. In one embodiment, a subject user's landing page can include a plot, similar to that shown in FIG. 4 that can be continually updated by the system when new information about the subject user is provided. In such an embodiment, as users continue to provide information about the subject user, and as other users, in turn, provide information about other users, the calculated compatibility between the subject user and other users can be refined.

A number of illustrative embodiments have been described. Nevertheless, it will be understood that various modifications may be made without departing from the spirit and scope of the various embodiments presented herein. For example, the systems and methods described herein can be modified to be capable of determining compatibility in other aspects, for example: in seeking candidates for employment; in housing, dormitory, and other living facilities, assigning residents in proximity to one another according to similar personality traits; in building clientele for business; and others. Accordingly, other embodiments are within the scope of the following claims.

TABLE I

| | Athletic | Outgoing | Intelligent | Honest | Loving | Motivated | Total |
|---|---|---|---|---|---|---|---|
| Raw User Input | | | | | | | |
| Tony | 0.035 | 0.050 | 0.390 | 0.060 | 0.380 | 0.085 | 1.000 |
| Amanda | 0.034 | 0.069 | 0.413 | 0.034 | 0.414 | 0.036 | 1.000 |
| Kristin | 0.046 | 0.192 | 0.214 | 0.162 | 0.223 | 0.163 | 1.000 |
| Erica | 0.025 | 0.125 | 0.190 | 0.292 | 0.217 | 0.151 | 1.000 |
| Sarah | 0.088 | 0.193 | 0.269 | 0.079 | 0.228 | 0.143 | 1.000 |
| Erin | 0.035 | 0.060 | 0.402 | 0.047 | 0.397 | 0.060 | 1.000 |
| Ashley | 0.040 | 0.131 | 0.314 | 0.098 | 0.319 | 0.100 | 1.000 |
| Megan | 0.036 | 0.159 | 0.202 | 0.227 | 0.220 | 0.157 | 1.000 |
| Tara | 0.056 | 0.159 | 0.230 | 0.186 | 0.223 | 0.147 | 1.000 |
| Jamie | 0.061 | 0.126 | 0.335 | 0.063 | 0.313 | 0.102 | 1.000 |
| Total | 0.456 | 1.263 | 2.958 | 1.247 | 2.933 | 1.144 | 10.000 |

| | Athletic | Outgoing | Intelligent | Honest | Loving | Motivated | Mass |
|---|---|---|---|---|---|---|---|
| Row Profiles | | | | | | | |
| Tony | 0.035 | 0.050 | 0.390 | 0.060 | 0.380 | 0.085 | 0.100 |
| Amanda | 0.034 | 0.069 | 0.413 | 0.034 | 0.414 | 0.036 | 0.100 |
| Kristin | 0.046 | 0.192 | 0.214 | 0.162 | 0.223 | 0.163 | 0.100 |

TABLE I-continued

| | Athletic | Outgoing | Intelligent | Honest | Loving | Motivated | Mass |
|---|---|---|---|---|---|---|---|
| Erica | 0.025 | 0.125 | 0.190 | 0.292 | 0.217 | 0.151 | 0.100 |
| Sarah | 0.088 | 0.193 | 0.269 | 0.079 | 0.228 | 0.143 | 0.100 |
| Erin | 0.035 | 0.060 | 0.402 | 0.047 | 0.397 | 0.060 | 0.100 |
| Ashley | 0.040 | 0.131 | 0.314 | 0.098 | 0.319 | 0.100 | 0.100 |
| Megan | 0.036 | 0.159 | 0.202 | 0.227 | 0.220 | 0.157 | 0.100 |
| Tara | 0.056 | 0.159 | 0.230 | 0.186 | 0.223 | 0.147 | 0.100 |
| Jamie | 0.061 | 0.126 | 0.335 | 0.063 | 0.313 | 0.102 | 0.100 |
| Mass | 0.046 | 0.126 | 0.296 | 0.125 | 0.293 | 0.114 | |

Column Profiles

| | Athletic | Outgoing | Intelligent | Honest | Loving | Motivated | Mass |
|---|---|---|---|---|---|---|---|
| Tony | 0.077 | 0.040 | 0.132 | 0.048 | 0.130 | 0.074 | 0.100 |
| Amanda | 0.075 | 0.055 | 0.140 | 0.027 | 0.141 | 0.031 | 0.100 |
| Kristin | 0.101 | 0.152 | 0.072 | 0.130 | 0.076 | 0.143 | 0.100 |
| Erica | 0.055 | 0.099 | 0.064 | 0.234 | 0.074 | 0.132 | 0.100 |
| Sarah | 0.193 | 0.153 | 0.091 | 0.063 | 0.078 | 0.125 | 0.100 |
| Erin | 0.076 | 0.047 | 0.136 | 0.038 | 0.135 | 0.053 | 0.100 |
| Ashley | 0.088 | 0.103 | 0.106 | 0.079 | 0.109 | 0.087 | 0.100 |
| Megan | 0.078 | 0.126 | 0.068 | 0.182 | 0.075 | 0.137 | 0.100 |
| Tara | 0.124 | 0.126 | 0.078 | 0.149 | 0.076 | 0.129 | 0.100 |
| Jamie | 0.134 | 0.100 | 0.113 | 0.051 | 0.107 | 0.089 | 0.100 |
| Mass | 0.046 | 0.126 | 0.296 | 0.125 | 0.293 | 0.114 | |

Expected Frequencies

| | Athletic | Outgoing | Intelligent | Honest | Loving | Motivated |
|---|---|---|---|---|---|---|
| Tony | 0.046 | 0.126 | 0.296 | 0.125 | 0.293 | 0.114 |
| Amanda | 0.046 | 0.126 | 0.296 | 0.125 | 0.293 | 0.114 |
| Kristin | 0.046 | 0.126 | 0.296 | 0.125 | 0.293 | 0.114 |
| Erica | 0.046 | 0.126 | 0.296 | 0.125 | 0.293 | 0.114 |
| Sarah | 0.046 | 0.126 | 0.296 | 0.125 | 0.293 | 0.114 |
| Erin | 0.046 | 0.126 | 0.296 | 0.125 | 0.293 | 0.114 |
| Ashley | 0.046 | 0.126 | 0.296 | 0.125 | 0.293 | 0.114 |
| Megan | 0.046 | 0.126 | 0.296 | 0.125 | 0.293 | 0.114 |
| Tara | 0.046 | 0.126 | 0.296 | 0.125 | 0.293 | 0.114 |
| Jamie | 0.046 | 0.126 | 0.296 | 0.125 | 0.293 | 0.114 |

Observed - Expected Frequencies

| | Athletic | Outgoing | Intelligent | Honest | Loving | Motivated |
|---|---|---|---|---|---|---|
| Tony | -0.011 | -0.076 | 0.094 | -0.065 | 0.087 | -0.029 |
| Amanda | -0.012 | -0.057 | 0.117 | -0.091 | 0.121 | -0.078 |
| Kristin | 0.000 | 0.066 | -0.082 | 0.037 | -0.070 | 0.049 |
| Erica | -0.021 | -0.001 | -0.106 | 0.167 | -0.076 | 0.037 |
| Sarah | 0.042 | 0.067 | -0.027 | -0.046 | -0.065 | 0.029 |
| Erin | -0.011 | -0.067 | 0.106 | -0.078 | 0.104 | -0.054 |
| Ashley | -0.006 | 0.004 | 0.018 | -0.027 | 0.025 | -0.015 |
| Megan | -0.010 | 0.032 | -0.094 | 0.102 | -0.073 | 0.043 |
| Tara | 0.011 | 0.033 | -0.066 | 0.061 | -0.071 | 0.033 |
| Jamie | 0.016 | -0.000 | 0.039 | -0.062 | 0.019 | -0.013 |

Chi-Square Distances

| | Athletic | Outgoing | Intelligent | Honest | Loving | Motivated | Total |
|---|---|---|---|---|---|---|---|
| Tony | 0.002 | 0.046 | 0.030 | 0.034 | 0.026 | 0.008 | 0.145 |
| Amanda | 0.003 | 0.026 | 0.046 | 0.066 | 0.050 | 0.054 | 0.245 |
| Kristin | 0.000 | 0.034 | 0.023 | 0.011 | 0.017 | 0.021 | 0.105 |
| Erica | 0.009 | 0.000 | 0.038 | 0.224 | 0.020 | 0.012 | 0.303 |
| Sarah | 0.039 | 0.035 | 0.002 | 0.017 | 0.015 | 0.007 | 0.116 |
| Erin | 0.003 | 0.035 | 0.038 | 0.048 | 0.037 | 0.025 | 0.186 |
| Ashley | 0.001 | 0.000 | 0.001 | 0.006 | 0.002 | 0.002 | 0.012 |
| Megan | 0.002 | 0.008 | 0.030 | 0.084 | 0.018 | 0.016 | 0.158 |
| Tara | 0.003 | 0.008 | 0.015 | 0.030 | 0.017 | 0.009 | 0.082 |
| Jamie | 0.005 | 0.000 | 0.005 | 0.031 | 0.001 | 0.001 | 0.044 |
| Total | 0.068 | 0.194 | 0.228 | 0.550 | 0.202 | 0.155 | 1.396 |

Relative Inertias

| | Athletic | Outgoing | Intelligent | Honest | Loving | Motivated | Total |
|---|---|---|---|---|---|---|---|
| Tony | 0.002 | 0.033 | 0.021 | 0.024 | 0.018 | 0.005 | 0.104 |
| Amanda | 0.002 | 0.019 | 0.033 | 0.047 | 0.036 | 0.038 | 0.175 |
| Kristin | 0.000 | 0.025 | 0.016 | 0.008 | 0.012 | 0.015 | 0.076 |
| Erica | 0.007 | 0.000 | 0.027 | 0.161 | 0.014 | 0.008 | 0.217 |

TABLE I-continued

| | | | | | | | |
|---|---|---|---|---|---|---|---|
| Sarah | 0.028 | 0.025 | 0.002 | 0.012 | 0.010 | 0.005 | 0.083 |
| Erin | 0.002 | 0.025 | 0.027 | 0.035 | 0.026 | 0.018 | 0.133 |
| Ashley | 0.000 | 0.000 | 0.001 | 0.004 | 0.002 | 0.001 | 0.008 |
| Megan | 0.002 | 0.006 | 0.021 | 0.060 | 0.013 | 0.011 | 0.113 |
| Tara | 0.002 | 0.006 | 0.011 | 0.021 | 0.012 | 0.007 | 0.059 |
| Jamie | 0.004 | 0.000 | 0.004 | 0.022 | 0.001 | 0.001 | 0.031 |
| Total | 0.049 | 0.139 | 0.163 | 0.394 | 0.145 | 0.111 | 1.000 |

Analysis of Contingency Table
Axis Inertia Proportion Cumulative Histogram

| | | | | | |
|---|---|---|---|---|---|
| 1 | 0.1140 | 0.8165 | 0.1672 | 0.8165 | ***************************** |
| 2 | 0.0233 | 0.9837 | | | ****** |
| 3 | 0.0102 | 0.9939 | | | |
| 4 | 0.0008 | 0.0014 | 0.0061 | 1.0000 | |
| Total | | | | 0.1396 | |

Row Contributions

| | | | | | Component 1 | | | Component 2 | | |
|---|---|---|---|---|---|---|---|---|---|---|
| ID | Name | Qual | Mass | Inert | Coord | Corr | Contr | Coord | Corr | Contr |
| 1 | Tony | 0.961 | 0.100 | 0.104 | -0.360 | 0.890 | 0.114 | -0.101 | 0.071 | 0.044 |
| 2 | Amanda | 0.985 | 0.100 | 0.175 | -0.485 | 0.961 | 0.206 | -0.076 | 0.023 | 0.024 |
| 3 | Kristin | 0.947 | 0.100 | 0.076 | 0.297 | 0.835 | 0.077 | 0.108 | 0.112 | 0.050 |
| 4 | Erica | 0.996 | 0.100 | 0.217 | 0.483 | 0.769 | 0.204 | -0.262 | 0.227 | 0.295 |
| 5 | Sarah | 0.986 | 0.100 | 0.083 | 0.081 | 0.057 | 0.006 | 0.328 | 0.929 | 0.460 |
| 6 | Erin | 1.000 | 0.100 | 0.133 | -0.422 | 0.958 | 0.157 | -0.089 | 0.042 | 0.034 |
| 7 | Ashley | 0.779 | 0.100 | 0.008 | -0.094 | 0.756 | 0.008 | 0.016 | 0.023 | 0.001 |
| 8 | Megan | 0.997 | 0.100 | 0.113 | 0.390 | 0.960 | 0.133 | -0.077 | 0.037 | 0.025 |
| 9 | Tara | 0.983 | 0.100 | 0.059 | 0.282 | 0.970 | 0.070 | 0.033 | 0.013 | 0.005 |
| 10 | Jamie | 0.989 | 0.100 | 0.031 | -0.171 | 0.663 | 0.026 | 0.120 | 0.326 | 0.061 |

Column Contributions

| | | | | | Component 1 | | |
|---|---|---|---|---|---|---|---|
| ID | Name | Qual | Mass | Inert | Coord | Corr | Contr |
| 1 | Athletic | 0.886 | 0.046 | 0.049 | 0.031 | 0.006 | 0.000 |
| 2 | Outgoing | 0.968 | 0.126 | 0.139 | 0.303 | 0.598 | 0.102 |
| 3 | Intelligent | 0.998 | 0.296 | 0.163 | -0.277 | 0.995 | 0.199 |
| 4 | Honest | 0.998 | 0.125 | 0.394 | 0.613 | 0.853 | 0.411 |
| 5 | Loving | 0.996 | 0.293 | 0.145 | -0.253 | 0.930 | 0.165 |
| 6 | Motivated | 0.958 | 0.114 | 0.111 | 0.350 | 0.905 | 0.123 |

| | | Component 2 | | |
|---|---|---|---|---|
| ID | Name | Coord | Corr | Contr |
| 1 | Athletic | 0.362 | 0.880 | 0.256 |
| 2 | Outgoing | 0.238 | 0.370 | 0.307 |
| 3 | Intelligent | -0.017 | 0.004 | 0.004 |
| 4 | Honest | -0.253 | 0.145 | 0.342 |
| 5 | Loving | -0.067 | 0.065 | 0.057 |
| 6 | Motivated | 0.084 | 0.053 | 0.035 |

TABLE II

| Name | Qual | Mass | Inert | Coord (X) | Coord (Y) | Least Square | Most Compatible |
|---|---|---|---|---|---|---|---|
| Tony | 0.961 | 0.1 | 0.104 | -0.36 | 0.89 | — | — |
| Erin | 1 | 0.1 | 0.133 | -0.422 | 0.958 | 0.092021737 | 1 |
| Amanda | 0.985 | 0.1 | 0.175 | -0.485 | 0.961 | 0.143756739 | 2 |
| Jamie | 0.989 | 0.1 | 0.031 | -0.171 | 0.663 | 0.29538111 | 3 |
| Ashley | 0.779 | 0.1 | 0.008 | -0.094 | 0.756 | 0.297845598 | 4 |
| Tara | 0.983 | 0.1 | 0.059 | 0.282 | 0.97 | 0.646965223 | 5 |
| Kristin | 0.947 | 0.1 | 0.076 | 0.297 | 0.835 | 0.659298112 | 6 |
| Megan | 0.997 | 0.1 | 0.113 | 0.39 | 0.96 | 0.753259583 | 7 |
| Erica | 0.996 | 0.1 | 0.217 | 0.483 | 0.769 | 0.851639595 | 8 |
| Sarah | 0.986 | 0.1 | 0.083 | 0.081 | 0.057 | 0.942533819 | 9 |

What is claimed is:

1. A computer-implemented method for determining a relationship compatibility between a first user and a second user of a plurality of users of an online matchmaking system said method comprising:

receiving at least one personal profile attribute storable in a first user profile received from a first user and at least one personal profile attribute storable in a second user profile received from a second user;

determining said relationship compatibility that reflects a matchmaking likelihood between said first user and said second user using an algorithm that incorporates at least said at least one personal profile attribute from each of said first and said second user profiles as variables;

receiving a relationship endorsement indicator of said first and said second user from a third user of said online match-making system, who is different from said first and said second user, said relationship endorsement indicator suggesting a relationship match between said first and said second user, wherein said relationship endorsement indicator is a further variable in said determining said relationship compatibility;

attributing a weighting factor to said relationship endorsement indicator such that said determined relationship compatibility is greater between said first and said second user than that of determined relationship compatibility values between said first user and at least one of said plurality of users exclusive of said second user where a relationship endorsement indicator has not been received therefor; and transmitting an indication of said determined relationship compatibility to an output register.

2. The method of claim 1, wherein said determining said relationship compatibility comprises using correspondence analysis between at least said first user and said second user among said plurality of users.

3. The method of claim 2, further comprising generating a graphic image that is renderable on an electronic display device comprising graphical results of said correspondence analysis.

4. The method of claim 2, further comprising calculating said relationship compatibility for a plurality of other system users and generating a matrix of compatibility data that ranks personality compatibility between said first system user and others of said plurality of users.

5. The method of claim 1, wherein said relationship compatibility corresponds to the likelihood that the personalities of said first system user and said second system user are compatible for the purposes of forming a relationship therebetween.

6. The method of claim 1, further comprising transmitting said indication of said relationship compatibility to said first user and, optionally, said second user.

7. The method of claim 1, wherein said personal profile attribute comprises one or more of: age, gender, sex, proclivities, moral viewpoints, ethical viewpoints, spiritual viewpoints, or political viewpoints.

8. The method of claim 1, further comprising:

receiving additional personal profile attributes associated with said first user or said second user from said third user; and integrating said additional personal profile attributes into said first user profile or said second user profile, respectively.

9. The method of claim 1, wherein said first user profile is configured to be capable of being displayed on an electronic display device that displays said at least one personal profile attribute and verification of said at least one personal profile attribute, if said verification is supplied by said third user or an acquaintance of said first user.

10. The method of claim 1, further comprising:

determining a relationship compatibility between said first user and each of a selected number of users of said plurality of users to provide a set of matched users; and ranking said matched users.

11. The method of claim 10, wherein ranking said matched users comprises attributing a first rank value for matched users within said set of matched users wherein, for a given determined relationship compatibility, a relationship endorsement indicator has been received by an acquaintance of said first user or one of said set of matched users.

12. The method of claim 11, wherein ranking said relationship matches further comprises attributing a second, higher rank value for matched users within said set of matched users wherein, for a given determined relationship compatibility, a relationship endorsement indicator has been received by both an acquaintance of said first user and one of said set of matched users.

13. The method of claim 10, wherein said ranking said matched users comprises ranking said matched users according to the number of mutual acquaintances between said first user and each user within said set of matched users.

14. The method of claim 13, wherein users within said set of matched users with a greater number of common acquaintances to said first user are ranked higher than matched users with a lesser number of common acquaintances to said first user.

15. A computer implemented method for determining a compatibility value between two or more users among a plurality of users of an online matchmaking community, said computer implemented method comprising:

electronically storing a first user profile comprising personality information received from a first user;

transmitting said first user profile to a second user, who is different from said first user, for the purpose of validating at least a portion of said personality information of said first user profile, wherein said second user is known to said first user;

receiving an endorsement of at least one component of said first user profile from said second user to generate a validated profile of said first user;

receiving a relationship recommendation or endorsement for said first user and a third user from one of said plurality of users who is neither said first user nor said third user;

determining a compatibility value for each of said first user and at least one of said plurality of users according to a matchmaking algorithm by comparing said verified profile of said first user with user profiles of said at least one of said plurality of users;

attributing a mathematical weighting factor to said relationship recommendation or endorsement in said matchmaking algorithm, such that said determined compatibility value between said first user and said third user is greater than a compatibility value determined for said first user and one of said plurality of users where a relationship recommendation or endorsement has not been received therefor; and transmitting an electronic signal representative of said compatibility value to an output register.

16. The method of claim 15, wherein said personality information comprises personality data received by said first user from an electronic form, said form comprising a plurality of questions configured to compile a personality profile.

17. The method of claim 16, wherein said receiving an endorsement of at least one component of said first user profile comprises receiving an indication of agreement or disagreement from said second user for at least one component of said personality data received by said first user.

18. The method of claim 17, wherein said first user's profile must meet a predetermined threshold verification value in order to perform said steps of determining said compatibility value and said transmitting an electronic signal representative of said compatibility value to said output register, wherein said predetermined threshold verification value reflects the number of endorsed components compared to the number of total components of said first user's profile.

19. The method of claim 15, further comprising comparing a selected threshold compatibility value with said determined compatibility to forecast the likelihood of a successful relationship between said first user and said second user.

20. A method for verifying a user profile in an online dating community, said method comprising:
receiving a personality profile from a first user comprising at least one profile component;
receiving a validation of said at least one profile component of said personality profile from a second user who is an acquaintance of said first user;
generating a validated user profile for said first user and computationally determining a compatibility value by comparing said validated user profile with a personality profile of a third user of said online dating community;
receiving a relationship endorsement for said first user and a third user from one of a plurality of users of said online dating community who is neither said first user nor said third user and mathematically weighting said relationship endorsement during said computationally determining a compatibility value such that said compatibility value is greater for said first user and said third user than a compatibility value determined for said first user and one of said plurality of users where a relationship endorsement has not been received; and
transmitting an electronic signal representative of said compatibility value to an output register.

21. The method of claim 20, wherein said computationally determining a compatibility value comprises using correspondence analysis.

22. The method of claim 20, wherein said computationally value is used to select a user from said plurality of users of said online dating community whose personality characteristics are calculated to be simular to said first user's personality characteristics.

23. The method of claim 22, further comprising receiving an indication from said first user as to the success or failure of a relationship between said first user and said third user, wherein a previously-determined compatibility value between said first user and said third user was equal to, or greater than a predetermined threshold compatibility value that previously indicated the likelihood of a successful relationship therebetween, and using said indication to refine said personality profile of said first user in subsequent determinations of said compatibility value with others of said plurality of users.

24. The method of claim 20, further comprising generating a validity score associated with said first user's validated user profile, wherein said validity score is commensurate with said second user's verification of said first user's personality profile.

25. The method of claim 24, further comprising transmitting said first user's personality profile to, and receiving verification responses from a plurality of said first user's acquaintances to refine said validity score.

\* \* \* \* \*